3,196,116
MULTIPLY METALLATED POLYMERIZATION
CATALYSTS
Oskar E. H. Klopfer, Clawson, and Oliver W. Burke, Jr.,
Grosse Pointe Park, Mich., assignors, by direct and
mesne assignments, to Continental Oil Company, Ponca
City, Okla., a corporation of Delaware
No Drawing. Filed Feb. 19, 1957, Ser. No. 641,047
3 Claims. (Cl. 252—429)

This invention relates to methods of polymerization, catalysts, therefore, and polymers therefrom and aims generally to improve the same. The present application is in part a continuation of our copending U.S. application S.N. 580,642, filed April 25, 1956, now abandoned entitled "Conjunctive Polymers, and Methods and Catalyst Systems for the Preparation Thereof," and is similarly related to our concurrently filed U.S. application S.N. 641,046, filed Feb. 19, 1957, now abandoned entitled "Multiply Metallated Catalyst Polymerization, Multiply Metallated Catalyst Therefor, and Polymers Therefrom," which itself is similarly related to said application S.N. 580,642.

In said copending applications we have disclosed, inter alia, that by employing multiply metallated materials, of the class consisting of metallated polymers and metallated organic compounds, as components of heterogeneous catalyst systems, unique polymers may be obtained from olefin, vinyl or diene monomers or mixtures of monomers from one or more of these groups.

Said copending applications have further disclosed, inter alia, that in general the new catalyst systems, produced by employing as component (1) one or more metallated organic compounds or polymers as hereinafter described, (2a) one or more metal-organic polar compounds as hereinafter described, (2b) one or more Friedel-Crafts type compounds as hereinafter described, with or without (3) one or more carrier components as hereinafter described, are useful for producing such unique polymers.

Further, said copending applications have disclosed, inter alia, that when the new catalyst system is produced by employing components (1) and (2b) with or without component (3), such system is well adapted for producing polymers differing in physical characteristics from those produced when component (2a) is also present in the system.

Still further, said copending applications have disclosed that when the hydrocarbon metal compound is essentially insoluble in nonactive hydrocarbon diluents (i.e., diluents that do not transmetallate with the metal-organic compounds of the catalyst under the conditions of preparation and use thereof) and when the metal thereof is from groups Ia or IIa of the periodic classification, especially the hydrocarbon compounds of the metals sodium, potassium, rubidium, cesium, calcium, strontium and barium and combinations of hydrocarbon compounds of these metals, to form catalyst component (1), with or without a polar metal-organic compound catalyst component (2a), and an active Friedel-Crafts type compound catalyst component (2b), and a carrier catalyst component (3), the new catalyst systems are especially useful when the monomer or monomers to be polymerized comprise diene or polar monomers, especially in the absence of olefin monomers.

Additionally, said copending applications have disclosed, that when components (2b) and/or (2a) are used, such components react, complex or associate, with the compound (1) employed, to produce a metallated organic compound having metal substituents or metal complex substituents in whole or in part different from those of the component (1) used in forming the catalyst system.

Thus the substitution and/or complexing reactions, set forth in said copending applications and herein, constitute disclosures of modes of obtaining the differently metallated catalysts of the present invention, and such new modes of producing the catalysts, as well as the new catalysts whether produced by such modes or otherwise, each constitute parts of the present invention.

When employing component (2b) in producing the catalyst, it is especially desirable to employ at least one Friedel-Crafts type compound, the metal of which in the salt form has more than one oxidation state and this fact is believed to be a contributing factor to the catalyst activity of catalysts produced from such and metallated organic compounds as set forth herein.

Furthermore, the order in which the components from groups (1), (2a) and (2b) are added, may have an effect on the structure of the complex substituent produced in the metallated catalyst composition, and may influence the nature of the polymers produced thereby.

The metallated compound or compounds of component (1) of the invention claimed herein, as above indicated, are non-polymeric metal compounds of hydrocarbons (which description includes dimer, trimer and tetramer hydrocarbon forms) and of substituted hydrocarbons, the substituents of which are not detrimental to the unique catalytic activity contributed to the material by the reactions with components (2b) and/or (2a).

Thus, particular objects of the invention severally and interdependently, are to provide new polymers that have new and useful characteristics, such as improved elastic nature in the case of certain polyolefins, crystallinity in the case of certain polyolefins, introduction of vulcanizability into essentially olefin polymers, the formation of co-, graft-co-, or inter-polymers from monomer materials difficult to copolymerize, and to provide new and improved methods and catalysts particularly but not exclusively adapted for the formation of such polymers. Further objects are to provide new polymers with dienes, olefins, vinyl hydrocarbons, aromatic vinyl hydrocarbons, and combinations thereof.

Other objects and advantages of the invention will be apparent from the following description of illustrative embodiments of the several features of the invention.

The invention disclosed and claimed herein, as above noted includes a part of the subject matter originally disclosed in our said copending application, and embraces the new metallated catalysts and polymerizations therewith, the new procedures for producing them, and the new and useful homo-polymers and copolymers produced by concurrent and/or sequential polymerization of one or more olefins, vinyls and/or dienes therewith (and useful for further chemical treatment as described in said copending application).

Thus the invention consists in the new catalysts, the new procedures for producing same, and the polymers produced thereby, as herein disclosed and more particularly pointed out in the appended claims.

COMPONENT (1)

As above noted, component (1) employed for producing the new catalysts consists of one or more metallated hydrocarbon compounds.

The hydrocarbon metal compounds selected as catalyst component (1) must be essentially insoluble in non-active hydrocarbon diluents and the metals thereof are selected from groups I$a$ and II$a$ of Mendeléeff's Periodic Table as follows: from group I$a$ sodium, potassium, rubidium, cesium; from group II$a$, calcium, strontium and barium.

The carbons of the metal-carbon bonds of the metallated compounds (1) are contained in a radical of a hydrocarbon selected from this class comprising (a) radicals of the paraffinic type hydrocarbons such as methane, ethane, propane, butane, isobutane, pentane, the isopentanes, hexane, the isohexanes etc.; (b) of the olefinic type hydrocarbons such as ethylene, propylene, the butenes, isobutenes, the pentenes, the isopentenes, the hexenes, the isohexenes, etc.; (c) of the cyclo-paraffinic and cyclo-olefinic hydrocarbon type such as those derived from and including cyclopropane, cyclobutane, cyclopentane, cyclopentene, cyclohexane and cyclohexene, isopropyl cyclohexene terpenes, etc.; (d) of the aromatic type hydrocarbons such as benzene, alkylbenzenes, biphenyl, alkylbiphenyl, other polyphenyls, the naphthalenes, including the alkylnaphthalenes such as the methyl-naphthalenes, etc.; (e) of the paraffinic type hydrocarbons with aromatic substituents including the above cited paraffins substituted with the above cited aromatics such as toluene, the xylenes, mesitylenes, ethylbenzene, the ethyltoluenes, the ethyl-xylenes, isopropylbenzene, the alkyl polyphenyls, the alkyl naphthalenes, etc.; (f) of the olefinic type hydrocarbons with aromatic substituents including the olefinics above substituted with the aromatics above such as phenyl ethylene, isopropenylbenzene, alpha-methyl styrene, the poly-alpha-methyl styrenes including especially the di-, tri- and tetra-alpha-methyl styrenes, the vinyltoluenes, diphenyl ethylene, etc.; and (g) of acetylene, its homologues and the cyclic and aromatic acetylenes, etc.; and such radicals may contain further substituents provided the latter are not made to deleteriously effect the catalysts being prepared.

In our parent case U.S. application S.N. 580,642 and in our copending U.S. application S.N. 641,046, filed Feb. 19, 1957, entitled "Multiply Metallated Catalyst Polymerizations, Multiply Metallated Catalysts Therefor, and Polymers Therefrom," it is disclosed that the hydrocarbon metal catalyst component (1) can be prepared whether multiply metallated or singly metallated, however, in this case we are only concerned with the singly metallated compounds. These comprise or are produced from the readily available lithium, sodium or potassium hydrocarbon compounds, especially those of sodium that in turn are produced by reacting sodium metal with an alkyl halide such as methyl chloride, ethyl chloride, n-propyl chloride, n-butyl chloride, n-amyl chloride, etc. The n-amyl sodium compound is typical of this group and has accordingly been used in many of the examples herein. The readily available metal-organic compounds of group I$a$ metals, especially those of sodium, may be further reacted with anhydrous metal halides, other metals desired to be substituted in the metal-organic compound, including in some instances the oxyhalides and especially the anhydrous chlorides of selected metals from the group consisting of sodium, potassium, rubidium, cesium, calcium, strontium and barium to form the catalyst component (1). Such reactions may produce in whole or in part the carrier catalyst component (3). Thus the catalyst component (1) of this invention is prepared easily and directly from reasonably priced available raw materials. Of course, the use of these simple and direct methods of preparation of catalyst component (1) does not exclude the use of other methods referred to in our copending applications and known in the chemical literature and patent art.

COMPONENT 2($a$)

The catalyst modifying polar compounds are employed as complexes or as complex formers, and comprise the complex-forming, organic donor compounds containing oxygen and/or nitrogen and/or sulfur, and/or selenium, and/or tellurium and/or halogens and which contain less than 32 carbon atoms and preferably less than 18 carbon atoms and in certain instances polymeric materials from monomers under this classification. Such donor compounds include organic acids, amino acids, ketones, diketones, aldehydes, acetals, esters, keto-esters, ethers, alcohols, phenols, ureas, amines, amides, nitriles, nitro- and nitroso-compounds, thioethers, hydroxythioethers, mercaptans, mercaptoethers, thiophenols, sulphones, and selenium and tellurium compounds similar to the preceding sulfur compounds, and halides and included among these are the activating additives cited heretofore the polymerization of preformed hydrocarbon polymers by alkali metals. Further the modifying polar compounds can include the oxygen or nitrogen-containing compounds of the free-radical generating type known as polymerization initiators and included dialkyl peroxides, such as methyl-t-butyl peroxide, di-t-butyl peroxide, di-t-amyl peroxide, etc.; arylalkyl peroxide such as ditriphenol methyl peroxide; the polyalkylidene peroxides, acetone peroxides, benzaldehyde peroxide, cyclohexanone peroxides, etc.; the azo compounds such as 2-azo-bisisobutyronitrile, 2-azo-bis-2-methylbutyronitrile, 2-azo-bis-2-methylheptonitrile, 1-azo-bis-1-cyclohexane carbonitrile, 2-azo-bis-isobutyric acid methyl ester and other azo compounds capable of activating polymerization.

Such donor compounds further include those compounds cited above in which the active hydrogens as, for example, in the alcohols, phenols, mercaptans, thiophenols, and enol-forming ketones, etc. is replaced by a suitable metal selected from the metals employed as substituents of component (1) above or of component 2($b$) below, providing the metal is catalytically compatible with the metal compounds employed in the other catalyst component or components.

These complex-forming donor compounds containing oxygen and/or nitrogen and/or sulfur, in certain instances, can be employed per se as the catalyst-modifying polar component 2($a$).

Further, these complex-forming, donor compounds may be complexed with one or more metallated hydrocarbon-metal-halide compounds, for example, the mixed alkyl and/or aryl-metal-halides including the fluoro-, chloro-, bromo-, and iodo-metal alkyl or aryl compounds to form component 2($a$). The hydrocarbon portions of such complexing compounds are selected from the hydrocarbons employable to form component (1) above. The metals of such complexing compounds are selected from the group consisting of the metals from which component (1) above is derived, the metals from which the Friedel-Crafts compounds of component 2($b$) below, are derived, and also lead.

Further, these complex-forming, donor compounds may be complexed with one or more of the Friedel-Crafts compounds of component 2($b$), hereinafter described, to form component 2($a$).

Just as the order of combination of the catalyst compounds influences the nature of the catalyst and of the polymers produced thereby, so it has been found that while the complexing of component 2(a) may be effected in situ in the presence of components (1) and/or 2($b$), the complexing of this component before combination with the other components of the catalyst generally produces a catalyst yielding an improved product.

Any of the catalyst modifying polar components 2($a$) containing oxygen, and/or nitrogen, and/or sulfur can be used singly or in combination.

COMPONENT 2($b$)

The compounds referred to in the appended claims as

"Friedel-Crafts" compounds as herein defined, and herein referred to as of the Friedel-Crafts type, that may be used in preparing the catalyst systems employed in this invention, comprise not only the acidic chlorides generally known as Friedel-Crafts type compounds, but also the reactive chlorides, and include the reactive halides, oxyhalides, and halide complexes with halogen acid, of metals of Groups I$b$, II, III, IV, V, VI, VII and VIII of Mendeléff's Periodic Table including from group I$b$, copper and silver, and from group II, zinc, cadmium and mercury, and from group III, boron, aluminum and gallium, and from group IV, titanium, zirconium, thallium, tin, hafnium and lead, and from group V, vanadium, niobium, tantalum, antimony and bismuth, and from group VI, chromium, molybdenum, tungsten, uranium and tellurium, and from group VII, manganese, and from group VIII, iron, cobalt and nickel. The halides and oxyhalides of metals of groups IV$a$, V$a$ and VI$a$ are especially active in promoting polymerizations with which the present invention is concerned and collectively may be described as active Friedel-Crafts type compounds, while those metals of groups I$a$, II$b$, III$a$, IV$b$, V$b$, VI$b$, VII$a$ and VIII are more or less inactive for certain polymerizations, but generally can aid the polymerization, and collectively may be designated as augmenting or auxiliary Friedel-Crafts type compounds. It is to be noted that in copending application S.N. 580,642 heretofore, cited certain of the groups V and VI Friedel-Crafts type compounds were listed as component (3) and are for greater accuracy included herein under component 2($b$).

The active Friedel-Crafts catalysts either singly or in combination with or without the aid of the augmenting Friedel-Crafts catalyst polymerize dienes, vinyls, olefins and their combinations. When the augmenting Friedel-Crafts catalysts are used singly or in combination with catalyst component (1) then the resulting catalysts are usually not very active and in many instances not significantly active, therefore, we prefer to employ at least a small amount of one or more of the active Friedel-Crafts type compounds with these auxiliary Friedel-Crafts type compounds to form active catalysts with catalyst component (1).

When polymerizable hydrocarbon dienes are being polymerized by the catalysts of this invention, and such catalysts are prepared from alkali-metallated hydrocarbons, it is not necessary to include component 2($b$), and when for such polymerizations a content of component 2($b$) is employed containing a quantity of halogen stoichiometrically less than that of the alkali metal of the metallated hydrocarbons for the purpose of varying the physical characteristics of the diene polymer being produced, by selecting Friedel-Crafts type compounds and the carrier, the degree of branching, the ratio of 1:2 to 1:4 polymerization, and the ratio of cis- and trans-configuration of the 1:4 polymerization can be controlled. Thus it will be appreciated by one skilled in the art from the present disclosure that by appropriate selection of the catalyst components virtually complete cis-1:4 polymerization and virtually complete trans-1:4 polymerization can be accomplished.

The molecular weights of the polymers produced with the new catalyst, while influenced by the temperature and amount of solvent of the recipe, are also affected by the polymerization-initiating activity of the catalyst, which we believe is in turn affected by the alkali metal content of the metallated catalyst since we consider the alkali metal substituents thereof to be diene polymerization-initiating parts of the catalyst in the absence of multi-oxidation state Friedel-Crafts type compound or compounds, while we believe that the latter are able to act as initiators, especially for alpha-olefin polymerizations, during transition of oxidation state, or in the event of thermal instability.

When dienes and olefins are copolymerized then small amounts of Friedel-Crafts type compounds of multi-oxidation state metals are employed which, during a transition of oxidation state, or in the event of thermal instability or in reacting with the metal of the multi-metallated hydrocarbon component (1), can actively initiate the copolymerization.

By a mono-oxidation state metal we mean a metal having compounds in which the metal has, for all practical purposes, only a single oxidation state, for example barium. By a multi-oxidation state metal we mean a metal having compounds in which the metal has two or more oxidation states as, for example, titanium which forms compounds with +2, +3 and +4 oxidation states. For the various oxidation states of the Friedel-Crafts type compounds see W. M. Latimer's treatise "Oxidation Potentials," published in 1952 by Prentice-Hall, Inc., N.Y.

When olefins and olefin mixtures are to be polymerized, it is again desirable to have at least a minor amount of one of the Friedel-Crafts type compounds with a multi-oxidation state present for facilitating the initiating of polymerization or copolymerization, and the remaining Friedel-Crafts type compound may be from the single oxidation state metals or also from a multi-oxidation state metal which is not per se, in certain instances, a polymerization initiator, although it may still react with all or part of the metal constituent of the metallated component (1) and augment the catalyst system.

The polymerization is believed to proceed because the monomers are adsorbed and activated for polymerization on the metallated hydrocarbon, alone or in combination with the Friedel-Crafts type compounds 2($b$) and the carriers (3). It so happens that the Friedel-Crafts type compounds with two or more oxidation states which can initiate a polymerization are often soluble in the solvent and/or monomers employed, and such have been observed to initiate polymerization at points remote from as well as at the catalyst surface, and to yield mixed polymers of the non-oriented and oriented types. Therefore, when oriented polymers only are desired we have discovered that by employing the 2($a$) component to suppress the insolubility of the initiating multi-oxidation state metal components, chiefly oriented surface contact polymerization is made to occur, yielding oriented or so-called crystalline polymer. By this means a virtually completely oriented polymerization, e.g., of propylene can be accomplished.

In contrast, when the multi-oxidation state polymerization-catalyzing Friedel-Crafts type compound is one which is easily soluble in the non-reactive hydrocarbon diluent or polymerizing monomer and such component 2($b$) is employed in greater quantity than necessary to complex with catalyst component (1) and no catalyst component 2($a$) is employed, then such catalyst can produce non-oriented polymers, for example, a non-crystalline polypropylene.

By intermediate combination of these components, optimum ratios of oriented and non-oriented types of polymers for desired characteristics (for example, easy moldability) are produced by the same polymerization.

Further, by special selection of the Friedel-Crafts type compound, e.g., the vanadium chloride, a polymer of partial crystallinity within the same macromolecule can be obtained, e.g., a partially crystalline polypropylene can be produced which has elastic characteristics and to a degree the tensile strength characteristics of the crystalline type.

We have found that very active, fine particle Friedel-Crafts chlorides can be obtained by burning the group IV, V, VI and VII metals and ferro-alloys of such metals at elevated temperatures in a stream of chlorine with or without reduction after treatment with metal powders, metal hydrides and carbides, and hydrogen. In special cases such halides can be treated with oxygen, water and organic compounds with reactive hydrogen such as alcohols. Table A illustrates typical ferro-alloys which have been found to produce Friedel-Crafts type chlorides from which to prepare the catalysts of this invention.

Table A

FERRO-ALLOYS

| Elemental analysis, percent | Fe–W | Fe–V | Fe–Mn | Fe–Mo | Fe–Cr | Fe–Cb |
|---|---|---|---|---|---|---|
| W | 81.02 | | | | | |
| V | | 62.0 | | | | |
| Mn | 0.13 | | 78.6 | | | |
| Mo | 0.70 | | | 62.6 | | |
| Cr | | | | | 71.23 | |
| Cb | | | | | | 57.36 |
| C | 0.51 | | 6.38 | | 0.4 | 0.35 |
| Si | 0.17 | | 1.38 | 0.56 | 0.57 | 6.47 |

For certain catalysts of this invention mixed Friedel-Crafts type compounds are highly desirable. By combining metals and alloys in preferred ratio and halogenating such at elevated temperatures Friedel-Crafts type compounds of desired composition are most economically obtained.

COMPONENT (3)

The carrier component for the new catalyst systems of this invention include certain metals and compounds of metals from groups I, II, III, IV, V, VI, VII and VIII of Mendeléeff's Periodic Table including from group I, lithium, sodium, potassium and copper; from group II, beryllium magnesium, calcium, strontium, barium, zinc and cadmium; from group III, boron and aluminum; from group IV, carbon, silicon, titanium, zirconium and tin; from group V, vanadium, tantalum, antimony and bismuth; from group VI, chromium, molybdenum and tungsten; from group VII, maganese and rhenium; and from group VIII, iron and in special instances cobalt and nickel.

The carrier must of course be substantially insoluble in the monomers to be polymerized and in the hydrocarbon diluent or solvent employed in the recipe, if any. When the carrier is in finely divided form it is preferable that it be readily soluble in water or dilute acid or alkali, so that the carrier may be readily removed from the polymer. The advantage of the insoluble carriers included hereunder are that such can be pelletized in desired forms, with or without additional binder materials, shaped or compressed into rods, tubes, rings, or other geometrical units, and can be baked and porosified as desired to afford adequate surface exposure. The formed carrier bodies can be surface treated with one or more of the components (1), 2(a) and 2(b) in liquid, dissolved, or vapor form, and in appropriate order. The Friedel-Crafts type components 2(b) may be applied to the formed carrier bodies by sublimation or by drying from solution, and the carrier bodies must of course be capable of withstanding drying temperatures. The multi-metallated component (1) material may be either preformed and applied to the carrier bodies as a liquid, or solution, depending on the compound concerned, or can be formed in situ on the carrier surface. The modifier components 2(a) are more conveniently applied in the uncomplexed form, and from materials that can be used as liquids, vapors, or as solutions, and when a component 2(a) cannot be applied in one of these forms, it may be formed in situ on the carrier.

The compounds of the metals that may be used include (a) salts of the aforecited metals with salt-forming components selected from groups II, III, IV, V, VI, VII and VIII including from group II, zincates; from group III, borates and aluminates; from group IV, carbonates, silicates, titanates, zirconates, stannates, stannites, plumbates and plumbites; from group V, nitrates, nitrites, phosphates, phosphites, vanadates, arsenates, arsenites, antimonates and antimonites; from group VI, sulfates, sulfites, chromates, molybdates, tungstates, selenates and tellurates; from group VII, the halides, oxyacid halides and manganates; and from group VIII, ferrates, ferrites and complexes including those of cobalt and nickel. Such compounds further include (b) the hydroxides of the group Ia metals including from this group the hydroxides of Ia metals including from this group the hydroxides of lithium, sodium and potassium and (c) the oxides of groups I, II, III, IV, V, VII, VIII preferably in their lower state of oxidation, that is, from group I, lithium oxide, sodium oxide, potassium oxide and copper oxide; from group II, beryllium oxide, magnesium oxide, calcium oxide, strontium oxide, barium oxide, zinc oxide, cadmium oxide and mercury oxides; from group III, boron oxide, aluminum oxide and rare earth metal oxides; from group IV, silica, titanium oxide, zirconium oxide, tin oxides, thorium oxide and lead oxides; from group V, vanadium oxides, tantalum oxides, arsenic oxides, antimony oxide and bismuth oxide; from group VI, chromium oxide, molybdenum oxides and tungsten oxides; from group VII, manganese oxides and rhenium oxides; from group VIII, iron oxides, cobalt oxides and nickel oxides; and the mixed oxides of these same metals.

Finally, the carrier may be carbon or a commercial carrier for catalytic agents as employed in the petroleum and chemical industries, and the above carriers may be used singly or in combination, including coordinated combination, and as synthetic or naturally occurring minerals. This component (3), the insoluble carrier, may be separately formed, or may be formed in situ in whole or in part, from the combining of the first and second components of the catalyst system, as when transmetallation is employed that produces sodium chloride.

Also, examples given in said copending parent application have shown that the metallated catalysts may be formed, in whole or in part, in the presence of monomers to be polymerized thereby, and said application has shown that polymerizations may be effected with such metallated catalysts either batchwise, or in continuous reactors such as that disclosed in copending application S.N. 580,655, filed April 25, 1956 (Kizer, Klopfer and Burke, Jr.), now U.S. Patent No. 3,074,924, and it will be understood that such alternative procedures may be employed in many instances in lieu of the procedures described to illustrate the practice of the invention in the examples herein, and that the flow-charts shown in our parent application S.N. 580,642 (and omitted here for brevity) illustrate procedures that may also be employed in the practice of the present invention.

Moreover, as heretofore shown, where the catalyst activity is dependent upon an oxidation state transition of the metals of the Friedel-Crafts type compounds, or due to thermal decomposition of one of the organo-metal compounds, or due to reactions between the Friedel-Crafts type compounds and the multiply metallated component (1), then catalyst aging becomes a factor, the catalyst seems most active immediately after its components are combined, and continuous polymerizations provide a means of easily controlling the age of the catalyst. Thus, when the components are combined in the presence of the monomers, the time factor is eliminated.

GENERAL PROCEDURES EMPLOYED IN EXAMPLES HEREINAFTER

In many of the following examples metallated hydrocarbon components of the catalysts have, for convenience, been produced via the alkali metallated compounds. Such procedure is particularly convenient because, inter alia, the alkali metals, and especially sodium, are readily available, inexpensive and very reactive.

The sodium alkyls, for example, employed as catalyst component (1) or as the metallating agents to form the metallated component, are readily prepared from sodium and the alkyl-chlorides, such as the methyl-, ethyl-, n-propyl-, n-butyl-, and n-amyl-chlorides.

Another convenient route is to directly singly alkali metallate hydrocarbons such as cyclopentadiene, fluorene, etc. which may also be employed per se when metallated or for trans-metallations.

Thus the parent case discloses that metallated hydrocarbon compounds of the metals other than sodium and potassium can be prepared by reacting sodium and potassium hydrocarbon compounds with anhydrous halides or oxyhalides of metals which are selected from groups Ia and IIa of Mendeléeff's periodic table, especially the anhydrous chlorides and oxychlorides of metals of group IIa, calcium, strontium, and barium. A hydrocarbon compound having a methyl group or methyl groups adjacent to a double bond or an aromatic ring and in some instances even a double bond without an adjacent methyl group can be mono-metallated by a transmetallation reaction by reacting said hydrocarbon with the alkyl sodium or potassium compounds and then further reacting this new compound with the selected metal halides of group IIa heretofore referred to. Thus singly metallated hydrocarbon of calcium, strontium, barium, are prepared by reacting with the aid of heat and ball-milling when necessary and preferably in the presence of an inert hydrocarbon solvent the sodium and/or potassium alkyl, alkaryl or aryl hydrocarbon compound with one or more of the anhydrous halides and especially calcium chloride, strontium chloride, barium chloride. Examples 118 and 119 of this case, the p-xylene mono-barium and p-xylene mono-cadmium, were prepared in this manner.

These groups Ia and IIa metal hydrocarbon compounds containing an intimate admixture of a group Ia metal halide are converted to new reaction products or catalysts, as disclosed in the parent case, by reacting singly or in combination in an inert hydrocarbon solvent such as pentane with Friedel-Crafts type compounds and including certain halides and oxyhalides which were listed among the carriers of the parent case and for greater accuracy are in this case referred to as the Friedel-Crafts type compound (catalyst component 2(*b*)) and include such compounds of the metals from group IV, titanium, zirconium and tin; from group V, vanadium, niobium, tantalum, antimony and bismuth; from group VI, chromium, molybdenum, tungsten, uranium and tellurium and including combinations of any of the preceding with or without compounds of metals from group VIII, iron, cobalt and nickel. These new compounds, especially when formed from the halides or oxyhalides and more particularly the chlorides or oxychlorides of metals of groups IVa, Va and VIa cited above, polymerize especially hydrocarbon dienes, vinyls, alpha-olefins and combinations of these monomers; however, VIa type catalysts do not rapidly homopolymerize the unsymmetrical alpha-olefins.

By the term symmetrical alpha-olefins, we mean polymerizable olefins of the class $CH_2=CR_2$ where R is a hydrocarbon radical and by unsymmetrical alpha-olefins we mean polymerizable olefins of the class $CH_2=CHR$ or $CH_2=CRR'$ where R and R' are different hydrocarbon radicals.

The parent case further discloses the process and the new products, and that the mono-metallated hydrocarbon compounds of metals of groups I, II and III and especially those compounds of sodium and potassium, with the aid of heat and ball-milling if necessary and preferably in the presence of an inert hydrocarbon solvent, can be reacted with the halides or oxyhalides especially the chlorides or oxychlorides of: group IV carbon, silicon tin, hafnium and lead; group V*b* phosphorous, arsenic, antimony and bismuth; group VI*b* sulfur, selenium and tellurium; and can be reacted with pseudo halogens, e.g., $(SCN)_2$, $(SeCN)_2$, BrCN, ClCN and with carbon dioxide, and in certain instances, the process for making such and the products are new. Further, these hydrocarbon compounds of tin, lead, antimony, bismuth, can be treated with Friedel-Crafts type compounds, with the aid of heat and ball-milling in the presence of an inert hydrocarbon solvent, to form combinations with these halides and oxyhalides, especially chlorides and oxychlorides of the metals of group IVa, titanium, zirconium; Va, vanadium, niobium, tantalum; and VIa, chromium, molybdenum and tungsten; VIIa manganese; VIII, iron, cobalt and nickel, and these combinations may have application as catalysts especially in combinations with heretofore cited catalysts.

The parent case discloses a method of preparing the mono-metallated hydrocarbon compounds of metals of groups Ia and IIa by reacting the anhydrous halide of these metals with metal hydrocarbon compounds from group I. It should be noted that with the formation of these groups Ia and IIa mono-metallated hydrocarbon compounds there is then present an equivalent amount of very finely dispersed halides of the displaced metal (catalyst component 3).

The properties of the catalysts depend in part on whether the finely dispersed metal halide is a lithium halide, sodium halide, potassium halide, rubidium halide or cesium halide and the extent of orientation of the monomers polymerized with such catalyst is also effected by the selection of this alkali metal halide component.

Further, we have found very active catalysts are produced by reaction, e.g., hydrocarbon sodium compounds, with less than a stoichiometric quantity of other groups Ia and IIa anhydrous metal chlorides and then treating these compounds with a Friedel-Crafts type compound of this invention.

It has been found that a finished catalyst of this invention formed from catalyst components (1), (2*b*) and (3) with or without (2*a*) can often be activated by adding an additional quantity of the mono-metallated hydrocarbon compound (catalyst component (1)), especially when such is metallated with metals of group I.

Thus, within the scope of new catalysts and catalyst components included in the parent case additional specific examples are set forth hereinafter.

The temperatures employed are usually room temperature or a bath temperature of 50 to 60° C. It is understood that for optimum reaction somewhat reduced or elevated temperatures can be employed for polymerization with the new catalysts.

The monomer pressures employed are relatively low, however, this does not exclude employing higher pressures. Where one wishes to operate in a diluent-free system then pressures necessary to liquify the monomers can be employed. Thus the catalysts herein employed can likewise be used in the high pressure ethylene process equipment.

The catalyst is removed from the polymer by simply washing with alcohol, water or both containing an acid which will form a soluble salt, in most cases hydrochloric acid is suitable, and for the metal compounds which dissolve more easily in aqueous alkali a solution containing an alkali such as caustic soda solution or ammonia is employed.

The typical laboratory procedure employed by which the catalyst is removed from the polymer, e.g., polyethylene, is as follows: a catalyst-polyethylene-pentane slurry of 100 g. polymer in 500 ml. diluent is thoroughly mixed with 100 ml. of isopropanol containg 25 ml. of conc. hydrochloric acid and then washed by agitating 4 times each with 500 ml. of water. The washing is continued until the metal salts are no longer present in the wash water. The polyethylene is then washed with 200 ml. of isopropanol containing 5 ml. of 28% aqueous ammonia and dried. If this is done with care a very low ash content or ash-free polymer, below 0.1%, is obtainable.

It is, of course, understood that by using ice water in closed systems and special agitators very small amounts of acid and alkali can be employed, e.g., a slight excess over stoichiometric amounts of acid or alkali to the metal compound of the catalyst employed, and alcohol is then unnecessary.

To protect the polymers against oxidation during molding it is advisable to add a few tenths of a percent, e.g., 0.2% based on weight of polymer, of an antioxidant such as ditertiary butyl p-cresol (Shell Chemical Corp.'s Ionol).

Amyl sodium can be prepared in various known ways, but we prefer to prepare such a catalyst component by a procedure in which, in the absence of air under dry nitrogen (a) four gram atoms of alkali metal (e.g., 92 grams of sodium metal) are heated in about one liter of decane, up to 110–130° C. to melt the sodium, and vigorously stirred with a high speed agitator for 30 minutes in the usual manner to disperse the sodium in finely divided form. Then the stirring speed is greatly reduced and the material cooled to room temperature. After settling, the decane is decanted, the sedimented sodium washed with pentane and then the sodium dispersion is diluted with pentane to a total volume of one gallon, and cooled to between −10° to −18° C. Then (b) two moles of an amyl halide (e.g., 213 g. of amyl chloride) are added over a period of 2–3 hours at −10° to −18° C. under conditions of high speed stirring to produce the reaction $$4Na + 2C_5H_{11}Cl \rightarrow 2NaCl + 2C_5H_{11}Na$$

after which the material is allowed to warm to room temperature. The amyl sodium suspension in pentane was titrated as follows: 25 ml. thereof required 12.5 cc. of 1 N-hydrochloric acid, therefore, 1 liter of the pentane suspension contained 0.5 mole of sodium as amyl sodium. Of course, during the preparation the amyl sodium could be replaced by pentane with a monomer to be polymerized, as for example, propylene.

Further, xylene mono-sodium is often employed in the examples herein and is conveniently prepared from an alkyl sodium compound. Amyl sodium is converted to xylene mono-sodium as follows: to 9.4 g. of amyl sodium (0.1 mole) as a pentane suspension with sodium chloride of 200 ml. in a pressure bottle is added 10.6 g. of xylene (0.1 mole) and heated to 65° C. and maintained for 2 to 3 hours.

In a similar manner one can prepare alpha-methyl styrene trimer mono-sodium. To 9.4 g. of amyl sodium (0.1 mole) as a pentane suspension with sodium chloride of 200 ml. in a pressure bottle is added 35.4 g. of alpha-methyl styrene trimer (Dow Chemical Co.'s Resin 76–V2) (0.1 mole) and heated to 65° C. and maintained for 2 to 3 hours.

For brevity and simplicity the examples have been arranged in tabular form. The letters after the quantity of ingredients indicate the order of addition in the particular example.

Whenever solids are being combined with solids it is very useful to ball-mill the product for a few hours until the inter-reaction of the solid material is complete.

The examples herein have been prepared in pressure glass bottles rotated in a constant temperature water bath or in a pressure vessel with an agitator.

It is important that the reactants and diluents be kept away from moisture and air be excluded from the reactions.

It is important to realize that the ratio of catalyst to monomers polymerized, that is, the polymer yield based on catalyst, is not significant. For when small batches of polymer are prepared without special precautions a considerable amount of catalyst is deactivated at the container surface. Thus we have found when running polymerizations of the type herein exemplified by a continuous process employing pumping equipment the catalyst requirement dropped to sometimes 1/10 or less of that required for the small batch laboratory preparation as given in the examples herein.

In the tables the polymerization time is not necessarily the reaction time but is the time which elapsed between charging the monomers and isolating the polymers.

Table B sets forth mono-metallated examples corresponding to 46 multiply metallated examples of our aforesaid copending applications and prepared by these same methods, generally described above, the mono-metallated examples employing molar equivalents of the hydrocarbon being transmetallated to the quantity of amyl or potassium alkyl employed in forming the mono-metallated catalyst component (1) of this invention.

The products are generally similar except that as a rule lower molding temperatures and less elastic products are obtained from olefins when catalyst component (1) is a mono-metallated hydrocarbon as compared to those obtained when the catalyst component (1) is multi-metallated. Thus, this case yields polymers that are especially useful where molding speed is an essential factor while our copending application yields polymers particularly adapted for extrusion purposes, especially where high softening point is desirable and excellent resistance to environmental stress cracking is sought after.

*Table B*

| Table No. | Copending U.S. application* | | Examples this case | |
|---|---|---|---|---|
| | Example No. | Multiply metallated compound | Example No. | Multiply metallated compound replaced by |
| IV | 68 | o-Xylene disodium | 118 | o-Xylene monosodium. |
| | 69 | m-Xylene disodium | 119 | m-Xylene monosodium. |
| | 71 | Mesitylene trisodium | 120 | Mesitylene monosodium. |
| | 73 | Dimethyl naphthylene disodium. | 121 | Dimethyl naphthalene monosodium. |
| | 74 | Alpha-methyl styrene trimer trisodium. | 122 | Alpha-methyl styrene trimer monosodium. |
| VI | 81–86 | p-Xylene disodium | 123–128 | p-Xylene monosodium. |
| | 87–88 | Alpha-methyl styrene trimer trisodium. | 129–130 | Alpha-methyl styrene trimer monosodium. |
| VII | 89–94 | p-Xylene disodium | 131–136 | p-Xylene monosodium. |
| VIII | 97 | Alpha-methyl styrene trimer trisodium. | 137 | Alpha-methyl styrene trimer monosodium. |
| | 98–99 | p-Xylene disodium | 138–139 | p-Xylene monosodium. |
| IX | 100–102 | p-Xylene disodium | 140–142 | p-Xylene monosodium. |
| X, XI | 103–113 | p-Xylene disodium | 143–153 | p-Xylene monosodium. |
| XII | 114 | Alpha-methyl styrene trimer trisodium. | 154 | Alpha-methyl styrene trimer monosodium. |
| | 115–117 | p-Xylene disodium | 155–157 | p-Xylene monosodium. |

*Example Nos. between 68 and 117 refer to the correspondingly numbered examples of copending U.S. application of O. W. Burke, Jr. and O. E. H. Klopfer, S.N. 641,046, filed Feb. 19, 1957, entitled "Multiply Metallated Catalyst Polymerizations, Multiply Metallated Catalysts Therefor, and Polymers Therefrom."

Table IV

EXAMPLES OF CATALYST COMPONENTS (1) MULTIPLY METALLATED COMPOUNDS

| Example No | 68 | 69 | 70 | 71 | 72 | 73 | 74 |
|---|---|---|---|---|---|---|---|
| Experiment No., K-VI | -107 | -108 | -117 | -97 | -106 | -113 | -102 |
| CATALYST—COMPONENT (1) MULTIPLY METALLATED COMPOUND | | | | | | | |
| Multiply metallatable compounds: | | | | | | | |
| o-Xylene, g | [1] 5.8b | | | | | | |
| m-Xylene, g | | 5.8b | | | | | |
| p-Xylene, g | | | 5.8b | | | | |
| Mixed xylenes, g | | | | 5.8b | | | |
| Mesitylene, g | | | | | 4.0b | | |
| Dimethyl naphthalene, g | | | | | | 7.8b | |
| Alpha-methyl styrene trimer,[2] g | | | | | | | 13b |
| Metallating compound: | | | | | | | |
| Amyl sodium (in pentane with sodium chloride), g | 9.4a | 9.4a | | 9.4a | 94.a | 9.4a | 9.4a |
| Amyl lithium (in pentane with lithium chloride), g | | | 7.8a | | | | |
| Diluent—Pentane, ml | 200a | 200a | 200a | 220a | 220 | 220a | 200a |
| Metallating Conditions: | | | | | | | |
| Time, hrs | 5 | 5 | 5 | 3 | 5 | 8 | 8 |
| Temperature, °C | 50 | 50 | 50 | 65 | 65 | 50 | 50 |
| COMPONENT 2(b)—FRIEDEL-CRAFTS TYPE COMPOUNDS | | | | | | | |
| Aluminum chloride, g | 4.4c | 4.4c | | 4.4c | 4.4c | 4.4c | 4.4c |
| Titanium tetrachloride, g | 1.0d | 1.0d | 3.0c | 1.0d | 1.0d | 1.0d | 1.0d |
| Ball-milling catalysts, hrs | 2c | 2c | | 2c | 2c | 2c | 2c |
| Monomers: | | | | | | | |
| Propylene, p.s.i | 30e | 30e | | 30e | 30e | 30c | |
| Butadiene, g | | | 100d | | | | |
| Ethylene, p.s.i | | | | | | | 500c |
| Polymerization conditions: | | | | | | | |
| Temperature, °C | 30 | 30 | 30 | 30 | 30 | 55 | 70 |
| Time, hrs.[3] | 16 | 42 | 4 | 16 | 16 | 16 | 96 |
| Yield, g | 25 | 18 | 100 | 12 | 17 | 25 | 50 |

[1] Letters a, b, c—indicate order of addition of ingredients.
[2] Dow Chemical Co. product designated Resin 276-V2.
[3] Time given in this table is not the reaction time but the time until polymer was isolated.

Table VI

EXAMPLES OF CATALYST COMPONENT 2(b) GROUP IV—FRIEDEL-CRAFTS COMPOUNDS

| Example No | 81 | 82 | 83 | 84 | 85 | 86 | 87 | 88 |
|---|---|---|---|---|---|---|---|---|
| Experiment No., K-VII | 38 | 28 | 21 | 34 | 33 | VI-4 | 23 | 39 |
| CATALYST—COMPONENT (1)—MULTIPLY METALLATED COMPOUND | | | | | | | | |
| Metallated compound: | | | | | | | | |
| p-Xylene disodium (in pentane with sodium chloride), g | [1] 11.2a | 15a | 15a | 15a | 15a | 15a | | |
| Alpha-methyl styrene trimer trisodium (in pentane with sodium chloride), g | | | | | | | 29a | 29a |
| Diluent—Pentane, ml | 300a | 400a | 400a | 400a | 400a | 400a | 400a | 400a |
| COMPONENT 2(b)—FRIEDEL-CRAFTS TYPE COMPOUND | | | | | | | | |
| Titanium—Titanium tetrachloride, g | | 9.5b | 6.4b | 9.5b | 6.4b | 6.4b | 6.4b | 6.4b |
| Zirconium—Zirconium tetrachloride, g | 5.8b | | | | | | | |
| Diluent—Pentane, ml | 50b | 95b | 64b | 95b | 64b | 64b | 64b | 64b |
| Monomers: | | | | | | | | |
| Ethylene, p.s.i | | 60c | 150c | [2] 110c | [2] 110c | [2] 78c | 150c | [2] 110c |
| Propylene, p.s.i | 30c | | | | | | | |
| Butadiene, g | | | | | 15c | | | |
| Isobutylene, g | | | | | | | | |
| Isoprene, g | | | | 15c | | 15c | | |
| Polymerization Conditions: | | | | | | | | |
| Temperature, °C | 30 | 50 | 52 | 52 | 52 | 52 | 52 | 50 |
| Time, hrs | 16 | 16 | 5 | 16 | 16 | 16 | 16 | 16 |
| Yield, g | 2 | 67 | 72 | 68 | 61 | 85 | 107 | 58 |
| Test Data: | | | | | | | | |
| Molding temperature, °C | 140 | 140 | 190 | 205 | 200 | 200 | 210 | 180 |
| Tensile strength, p.s.i | 1,450 | 3,560 | 5,340 | 4,700 | 2,860 | 8,500 | 5,550 | 5,800 |
| Elongation, percent | 100 | 400 | 500 | 525 | 400 | | 450 | 600 |

[1] Letters a, b, c indicate order of addition of ingredients.
[2] In grams charged.

Table VII

EXAMPLES OF ELASTIC MATERIALS

| Example No. | 89 | 90 | 91 | 92 | 93 | 94 | 95 | 96 |
|---|---|---|---|---|---|---|---|---|
| Experiment No., K- | VI-137 | VI-7 | VI-11 | VI-12 | VI-6 | VII-14 | VII-51A | VII-51B |
| CATALYST—COMPONENT (1)—MULTIPLY METALLATED COMPOUND | | | | | | | | |
| Metallated compound: | | | | | | | | |
| p-Xylene disodium (in pentane with sodium chloride), g | 17.5a | 15a | 15a | 15a | 15a | 15a | 7.5a | -------- |
| Alpha-methyl styrene trimer trisodium (in pentane with sodium chloride), g | -------- | -------- | -------- | -------- | -------- | -------- | -------- | 14.5a |
| Diluent—Pentane, ml | 200a | 400a | 400a | 400a | 400a | 400a | 150a | 150a |
| COMPONENT 2(a)—CATALYST MODIFYING POLAR COMPOUND | | | | | | | | |
| Sodium isopropoxide | -------- | -------- | -------- | -------- | -------- | -------- | 5.5b | 5.5b |
| COMPONENT 2(b)—FRIEDEL-CRAFTS TYPE COMPOUND | | | | | | | | |
| Titanium tetrachloride, g | 3.2b | 9.48b | 9.48b | 9.48b | 6.4b | 9.48b | -------- | -------- |
| Diluent—Pentane, ml | 32b | 94b | 94b | 94b | 64b | 94b | -------- | -------- |
| Monomers: | | | | | | | | |
| Isobutylene, g | -------- | -------- | -------- | -------- | -------- | 142.5c | -------- | -------- |
| Ethylene, g | -------- | -------- | -------- | 76c | 70c | -------- | -------- | -------- |
| Propylene, g | 58c | 142.5c | 142.5c | 75c | -------- | -------- | -------- | -------- |
| Isoprene, g | -------- | 7.5c | -------- | -------- | -------- | -------- | -------- | -------- |
| Butadiene, g | -------- | -------- | 7.5c | 5c | 110c | 7.5c | 20c | 20c |
| Polymerization conditions: | | | | | | | | |
| Temperature, °C | 30 | 53 | 53 | 50 | 53 | 53 | 50 | 50 |
| Time, hrs | 48 | 16 | 16 | 16 | 16 | 16 | 2 | 2 |
| Yield of elastomer, g | 56 | 125 | 78 | 79 | 144.5 | 38 | 7 | 7 |

[1] Letters a, b, c, indicate order of addition of ingredients.

Table VIII

EXAMPLES OF CATALYST COMPONENT 2(b) GROUP V—FRIEDEL-CRAFTS COMPOUNDS

| Example No. | 97 | 98 | 99 |
|---|---|---|---|
| Experiment No., K-VII- | -54A | -37 | 53(3) |
| CATALYST—COMPONENT (1)—MULTIPLY METALLATED COMPOUND | | | |
| Metallated compound: | | | |
| p-Xylene disodium (in pentane with sodium chloride), g | -------- | 7.5a | 3.7a |
| Alpha-methyl styrene trimer trisodium (in pentane with sodium chloride), g | [1] 29a | -------- | -------- |
| Diluent—Pentane, ml | 400a | 200a | 100a |
| COMPONENT 2(b)—FRIEDEL-CRAFTS TYPE COMPOUNDS | | | |
| Vanadium: | | | |
| Vanadium chloride (VCl₄) | -------- | 2.5b | -------- |
| Ferro-vanadium chlorides [3] | 6.4b | -------- | -------- |
| Columbian—Ferro-columbium chlorides [3] | -------- | -------- | 1.56 |
| Diluent—Pentane, ml | 100b | 50b | 50b |
| Monomers: | | | |
| Ethylene, p.s.i | 30c | -------- | 30c |
| Propylene, p.s.i | -------- | 40c | -------- |
| Polymerization conditions: | | | |
| Temperature, °C | 30 | 30 | 30 |
| Time, hrs | 1.5 | 16 | 2.5 |
| Yield, percent | 100 | [2] 87 | 100 |
| Test data: | | | |
| Molding temperature, °C | 200 | 120 | 190 |
| Tensile strength, p.s.i | 6,330 | 1,940 | 3,775 |
| Elongation, percent | 400 | 375 | 325 |

[1] Letters a, b, c indicate order of addition of ingredients.
[2] Consists of mixed pentane soluble and insoluble polypropylene, however, only pentane insoluble polypropylene is obtained by complexing the vanadium chloride with selected 2(a) components such as diethylether.
[3] Prepared by elevated temperature chlorination of alloy Fe-V and Fe-Cb, Table I.

Table IX

EXAMPLES OF CATALYST COMPONENT 2(b) GROUP VIa FRIEDEL-CRAFTS COMPOUNDS

| Example No. | 100 | 101 | 102 |
|---|---|---|---|
| Experiment No., K-VIII- | 52-2 | 62A | 62B |
| CATALYST—COMPONENT (1)—MULTIPLY METALLATED COMPOUND | | | |
| Metallated compound—p-Xylene disodium (in pentane with sodium chloride), g | [1] 7.5a | 7.5a | 7.5a |
| Diluent—Pentane, ml | 200a | 200a | 200a |
| COMPONENT 2(b)—FRIEDEL-CRAFTS TYPE COMPOUNDS | | | |
| Chromium—Chromyl chloride | 1.29b | -------- | -------- |
| Molybdenum—Ferro-molybdenum chloride [2] | -------- | 4.5b | -------- |
| Tungsten—Ferro-tungsten chloride [2] | -------- | -------- | 4.7b |
| Monomers—Ethylene, p.s.i | 30e | 30e | 30 |
| Polymerization conditions: | | | |
| Temperature, °C | 30 | 30 | 30 |
| Time, hrs | 16 | 16 | 16 |
| Yield, percent | 100 | 25 | 50 |
| Test Data: | | | |
| Molding temperature, °C | 190 | 160 | 170 |
| Tensile strength, p.s.i | 4,500 | 2,500 | 2,450 |
| Elongation, percent | 10 | 25 | 100 |

[1] Letters a, b, c indicate order of addition of ingredients.
[2] Prepared by elevated temperature chlorination of alloy Fe-Mo and Fe-W, Table I.

Table X

EXAMPLES OF CATALYST COMPONENT 2(a) MODIFYING POLAR COMPOUNDS

| Example No | 103 | 104 | 105 | 106 | 107 | 108 |
|---|---|---|---|---|---|---|
| Experiment No. X- | 77A | 77B | 77F | 77C | 77D | 77E |
| CATALYST—COMPONENT (1)—MULTIPLY METALLATED COMPOUND | | | | | | |
| Metallated compounds: | | | | | | |
| p-Xylene disodium (in pentane with sodium chloride), g | [1] 7.5a | 7.5a | 7.5a | 7.5a | 7.5a | 7.5a |
| Amyl sodium (in pentane with sodium chloride), g | 2.3d | 2.3d | 2.3d | 2.3d | 2.3d | 2.3d |
| COMPONENT 2(a)—CATALYST MODIFYING POLAR COMPOUND | | | | | | |
| Ketone—Diisopropylketone, g | 2.8c | | | | | |
| Amine: | | | | | | |
| N-Phenyl-N'-cyclohexyl-p-phenylenediamine, g | | 6.6c | | | | |
| Pyridine, g | | | 2.0c | | | |
| Carbonate—Diethylcarbonate, g | | | | 2.9c | | |
| Aldehyde—Butyraldehyde, g | | | | | 1.8c | |
| Ether-Amine—Morpholine, g | | | | | | 2.2c |
| Diluent—Pentane, ml | 700a | 700a | 700a | 700a | 700a | 700a |
| COMPONENT 2(b)—FRIEDEL-CRAFTS TYPE COMPOUNDS | | | | | | |
| Titanium tetrachloride, g | 4.7b | 4.7b | 4.7b | 4.7b | 4.7b | 4.7b |
| Monomers—Propylene, p.s.i | 40e | 40e | 40e | 40e | 40e | 40e |
| Polymerization conditions: | | | | | | |
| Temperature, °C | 30 | 30 | 30 | 30 | 30 | 30 |
| Time, hrs | 16 | 16 | 16 | 16 | 16 | 16 |
| Yield, g | 14 | 21.5 | 8.3 | 6.4 | 8.4 | 7.5 |
| Test Data: | | | | | | |
| Molding Temperature, °C | 165 | 165 | [2] 215 | 235 | [2] 230 | [2] 245 |
| Tensile Strength, p.s.i | 1,800 | 1,800 | | 1,330 | | |
| Elongation, Percent | 350 | 380 | | 500 | | |

[1] Letters a, b, c indicate order of addition of ingredients.
[2] Fusing slightly.

Table XI

EXAMPLES OF CATALYST COMPONENTS 2(a) MODIFYING POLAR COMPOUNDS

| Example No | 109 | 110 | 111 | 112 | 113 |
|---|---|---|---|---|---|
| Experiment No., K-VII- | 35II | 35IV | 25A | 25B | 27 |
| CATALYST—COMPONENT (1)—MULTIPLY METALLATED COMPOUND | | | | | |
| Multiply metallatable compound—p-Xylene, g | [1] 13.4b | 13.4b | 13.4b | 13.4b | 13.4b |
| Metallating compound—Amyl sodium (in pentane with sodium chloride), g | 18.8a | 18.8a | 18.8a | 18.8a | 18.8a |
| Diluent—Pentane, ml | 700a | 700a | 700a | 700a | 700a |
| Metallating conditions: | | | | | |
| Time, hrs | 3 | 3 | 3 | 3 | 3 |
| Temperature, °C | 50 | 50 | 50 | 50 | 50 |
| COMPONENT 2(a)—CATALYST MODIFYING POLAR COMPOUND | | | | | |
| Ethyletherate of aluminum—Chloride (1 to 1 mole ratio), g | | | 4.8d | 7.2d | 6.9d |
| Ethyl ether | | 14.8d | | | |
| COMPONENT 2(b)—FRIEDEL-CRAFTS TYPE COMPOUNDS | | | | | |
| Titanium tetrachloride, g | 9.4c | 9.4c | 9.5c | 4.7c | 4.7c |
| Monomers—Propylene, p.s.i | 40d | 40f | 40f | 40f | 40f |
| Polymerization conditions: | | | | | |
| Temperature, °C | 30 | 30 | 30 | 30 | 30 |
| Time, hrs | 24 | 24 | 60 | 60 | 72 |
| Yield, g | 21.8 | 6 | 31.5 | 4.7 | 33.2 |
| Test data: | | | | | |
| Physical appearance [2] | el. | cl.-pl. | pl. | pl. | pl. |
| Molding temperature, °C | 100 | 140 | 155 | 160 | 170 |
| Tensile strength, p.s.i | 300 | 2,000 | 2,900 | 3,820 | 4,000 |
| Elongation, percent | 150 | 50 | 650 | 900 | 150 |

[1] Letters a, b, c indicate order of addition of ingredients.
[2] Pl.=plastic; el.=elastomer; el.-pl.=elastic-plastic.

Table XII

EXAMPLES OF CATALYST COMPONENTS 2(a) MODIFYING POLAR COMPOUNDS

| Example No. | 114 | 115 | 116 | 117 |
|---|---|---|---|---|
| Experiment No., K-VII | -47 | -29 | -26 | -35 |
| CATALYST— COMPONENT (1)—MULTIPLY METALLATED COMPOUND | | | | |
| Multiply metallatable compounds: | | | | |
| p-Xylene, g | | 13.4b | 13.4b | 11.6b |
| Alpha-methyl styrene trimer | 24b[1] | | | |
| Metallating compound—Amyl sodium (in pentane with sodium chloride), g | 18.8a | 18.8a | 18.8a | 11.6a |
| Diluent—Pentane, ml | 700a | 700a | 700a | 700a |
| Metallating Conditions: | | | | |
| Time, hrs | 2 | 2 | 2 | 2 |
| Temperature, °C | 60 | 60 | 60 | 60 |
| COMPONENT 2(a)—CATALYST MODIFYING POLAR COMPOUND | | | | |
| Ethyl etherate of aluminum chloride, grams | 6.9d | 2.9d | 6.9d | |
| Ethyl etherate of titanium tetrachloride, grams | | | | 24.2c |
| COMPONENT 2(b)—FRIEDEL-CRAFTS TYPE COMPOUND | | | | |
| Titanium tetrachloride, g | 4.7c | 9.5c | 4.7c | |
| Monomers: | | | | |
| Ethylene, p.s.i | 400e | 400e | 60e | |
| Propylene, p.s.i | | | | 40e |
| Polymerization conditions: | | | | |
| Temperature, °C | 50 | 50 | 50 | 30 |
| Time, hrs | 16 | 16 | 16 | 24 |
| Yield, g | 126 | 84 | 37 | 2[3] |
| Test data: | | | | |
| Physical appearance[2] | pl. | pl. | pl. | pl. |
| Molding temperature, °C | 210 | 150 | 155 | 120 |
| Tensile strength, p.s.i | 5,150 | 3,440 | 6,680 | 1,500 |
| Elongation, percent | 250 | 300 | 200 | 100 |

[1] Letters a, b, c indicate order of addition of ingredients.
[2] pl.=plastic.
[3] When ether was omitted elastomer yield 88% on propylene charged.

Table C, Examples 164 to 167, teaches how catalyst component (1) which are hydrocarbon metal compounds insoluble in non-active hydrocarbon diluent such as pentane, of the metals sodium, potassium and barium are converted into catalysts by combining with Friedel-Crafts type compound, titanium tetrachloride, zinc chloride, and the vanadium chlorides from ferro-vanadium alloy to polymerize ethylene, propylene and butadiene. In a like manner hydrocarbon compounds of rubidium, cesium, calcium and strontium can be combined with the active and auxiliary Friedel-Crafts type compounds (catalyst component 2(b)) and hydrocarbon dienes, vinyls, olefins and combinations of these can be polymerized.

In the parent case is disclosed the polymerization of halo-monomers employing the catalysts of the invention which do not react with the halo-monomers or polymers therefrom to split off hydrogen halide compounds.

For the polymerization of unsaturated monomers containing halogens, more especially vinyl chloride, it is important that the catalyst composition is such as not to promote the splitting off of the hydrogen halide compound from the monomers or polymers containing halogen before, during or after the polymerization has taken place.

To prepare catalysts to polymerize the monomers containing halogen we prefer to employ as catalyst component (1) the mono-metallated hydrocarbon compounds from metals of group Ia including sodium, potassium, cesium and rubidium and from group IIa, calcium, strontium, barium and combinations of these metals. In forming the catalysts for the aforesaid purpose we prefer to employ the Friedel-Crafts type compounds, including the halides and oxyhalides of the metals from group IIb, especially zinc and cadmium and from group IVb, tin and lead; and combinations of these, activated with a small amount of an active Friedel-Crafts type compound of a metal selected from Groups IVa, Va and VIa of the Periodic Table.

Table C

EXAMPLES OF CATALYST COMPONENT (1) FROM GROUPS I AND II

| Example No. | 164 | 165 | 166 | 167 |
|---|---|---|---|---|
| Experiment No., K-VII- | 74A | 74B | 75 | 58B |
| CATALYST—COMPONENT (1)—METALLATED COMPOUND | | | | |
| Metallated compound Group I: | | | | |
| Amyl sodium (in pentane with sodium chloride), g | [1] 9.4a | 9.4a | | |
| Amyl barium (in pentane with sodium chloride), g | | | | 13.9a |
| p-Xylene potassium (in pentane with potassium chloride), g | | | 28.8a | |
| Diluent—Pentane, ml | 300a | 300a | 400a | 250a |
| COMPONENT 2(b)—FRIEDEL-CRAFTS TYPE COMPOUND | | | | |
| Titanium tetrachloride, g | 1.05c | 1.05c | | |
| Ferro-vanadium chloride, g.[2] | | | | 5b |
| Zinc chloride, g | 5.1b | 5.1b | | |
| Chromyl chloride, g | 0.65b | 0.65b | 2b | |
| Diluent: | | | | |
| Pentane, ml | 15c | 15c | 20b | 45b |
| Ball-milling, hrs | 5b | 5b | | |
| Monomers: | | | | |
| Ethylene, g | 14d | | | 300c |
| Propylene, p.s.i | | 30d | | |
| Butadiene, g | | | 50c | |
| Polymerization conditions: | | | | |
| Temperature, °C | 30 | 30 | 30 | 30 |
| Time, hrs | 2 | 2 | 16 | 2 |
| Yield, percent | 100 | 50 | 100 | 100 |
| Test data: | | | | |
| Physical state[3] | PL | EL | EL | PL |
| Molding temperature, °C | 155 | | | 205 |
| Tensile strength, p.s.i | 4,300 | | | 2,660 |
| Elongation, percent | 500 | | | 300 |

[1] Letters a, b, c indicate order of addition of ingredients.
[2] Prepared by elevated temperature chlorination of alloys Fe-V, see Table A.
[3] EL=Elastomeric; PL=Plastic.

Table D, Examples 172 to 175, further teaches how the catalysts can be prepared from catalyst component (1) with an active Friedel-Crafts type compound (catalyst component 2(b)) selected from the metals of group 2(b) with or without modifying polar compounds (catalyst component 2(a)). Example No. 174 was an elastomeric polypropylene with over 1000 p.s.i. tensile strength at 50% elongation.

Table D

EXAMPLES OF CATALYST COMPONENTS 2(b) GROUP IV FRIEDEL-CRAFTS COMPONENT WITH AND WITHOUT 2(a) MODIFYING POLAR COMPOUND

| Example No. | 172 | 173 | 174 | 175 |
|---|---|---|---|---|
| Experiment No., K-VII- | 36-2 | 36-1 | 69B | 24 |
| CATALYST—COMPONENT (1)—METALLATED COMPOUND | | | | |
| Metallating and metallated compound—Amyl sodium (in pentane with sodium chloride), g | [1] 18.8a | 18.8a | 9.4a | 18.8a |
| Diluent—Pentane, ml | 700a | 700a | 400a | 400a |
| Metallatable compound—Toluene, g | | | 9.3b | |
| Metallating conditions: | | | | |
| Time, hrs | | | 2b | |
| Temperature, °C | | | 60b | |
| COMPONENT 2(a)—CATALYST MODIFYING POLAR COMPOUND | | | | |
| Ethyl etherate of titanium tetrachloride (1 to 1 mole ratio), g | 24.4b | | | |
| COMPONENT 2(b)—FRIEDEL-CRAFTS TYPE COMPOUND | | | | |
| Titanium tetrachloride, g | | 9.5b | 4.7c | 6.4b |
| Monomers: | | | | |
| Ethylene, p.s.i | | | | 100b |
| Propylene, p.s.i | 30c | 30c | 30d | |
| Polymerization conditions: | | | | |
| Temperature, °C | 30 | 30 | 50 | 52 |
| Time, hrs | 24 | 24 | 16 | 16 |
| Yield, percent | 12 | 100 | 70 | 100 |
| Test Data: | | | | |
| Physical state[2] | PL | EL | EL | PL |
| Molding temperature, °C | 140 | | | 210 |
| Tensile strength, p.s.i | 3,400 | | | 4,820 |
| Elongation, percent | 125 | | | 350 |

[1] Letters a, b, c, indicate order of addition of ingredients.
[2] EL=Elastomeric; PL=Plastic.

Table E, Examples 168 to 171, teaches how Friedel-Crafts type components from group V metals can be used to form the catalysts of this invention together with catalyst component (1).

*Table E*

EXAMPLES OF CATALYST COMPONENT 2(b) GROUP V FRIEDEL-CRAFTS COMPOUNDS

| Example No. | 168 | 169 | 170 | 171 |
|---|---|---|---|---|
| Experiment No., K-VIII- | 54B | X-71A | 53(2) | 53(1) |
| CATALYST— | | | | |
| COMPONENT (1)—METALLATED COMPOUND | | | | |
| Metallated compound—Amyl sodium (in pentane with sodium chloride), g | [1] 9.4a | 3.7a | 4.7a | 4.7a |
| Diluent—Pentane, ml | 400a | 300a | 100a | 100a |
| COMPONENT 2(b)—FRIEDEL-CRAFTS COMPOUND | | | | |
| Vanadium: | | | | |
| Vanadium chloride (VCl$_4$), g | 6.4 | | | |
| Ferro-vanadium chloride, g | | 4.5b | | |
| Columbium—Ferro-columbium chloride,[2] g | | | 1.56 | 1.56 |
| Diluent—Pentane, ml | 50b | 50b | 50b | 50b |
| Monomers: | | | | |
| Ethylene, p.s.i | 30c | | | 30c |
| Propylene, p.s.i | | 40c | 40c | |
| Polymerization Conditions: | | | | |
| Temperature, °C | 30 | 30 | 30 | 30 |
| Time, hrs | 1.5 | 16 | 16 | 16 |
| Yield, percent | 100 | 12 | 20 | 100 |
| Test data: | | | | |
| Molding temperature, °C | 195 | 180 | 170 | 180 |
| Tensile strength, p.s.i | 5,450 | 2,000 | 5,000 | 4,640 |
| Elongation, percent | 450 | 700 | 350 | 420 |

[1] Letters a, b, c indicate order of addition of ingredients.
[2] Prepared by elevated temperature chlorination of alloy Fe-V and Fe-Cb, see Table A.

In Table F, Examples 176 to 178, is taught how catalyst prepared with catalyst component (1) and an active Friedel-Crafts type compound selected from the metals of group VIa with or without a modifying polar compound (catalyst component 2(a)) can be employed in accordance with the present invention. It should be pointed out that chromyl chloride can effectively be used in combination with other Friedel-Crafts compounds of the active and auxiliary types to produce novel catalysts of this invention.

*Table F*

EXAMPLES OF CATALYST COMPONENT 2(b) GROUP VIa FRIEDEL-CRAFTS COMPOUNDS

| Example No. | 176 | 177 | 178 |
|---|---|---|---|
| Experiment No., K-VII- | 53B | 71B | 72 |
| CATALYST— | | | |
| COMPONENT (1)—METALLATED COMPOUND | | | |
| Amyl sodium (in pentane with sodium chloride), g | [1] 4.7a | 9.4a | 9.4a |
| Diluent—Pentane, ml | 400a | 200a | 200a |
| COMPONENT 2(b)—FRIEDEL-CRAFTS TYPE COMPOUNDS | | | |
| Chromium—Chromyl chloride, g | 1.29b | | |
| Molybdenum: | | | |
| Ferro-molybdenum chloride,[2] g | | 4b | |
| Ethyl ether, g | | 1.4c | |
| Tungsten—Ferro-tungsten chloride,[2] g | | | 6b |
| Diluent—Pentane, ml | | 230b | |
| Monomers—Ethylene, p.s.i | 30e | 30d | 350c |
| Polymerization conditions: | | | |
| Temperature, °C | 30 | 30 | 30 |
| Time, hrs | 16 | 16 | 16 |
| Yield, percent | 42 | 42 | 20 |
| Test data: | | | |
| Molding temperature, °C | 190 | 160 | 170 |
| Tensile strength, p.s.i | 4,440 | 5,200 | 6,600 |
| Elongation, percent | 380 | 250 | 150 |

[1] Letters a, b, c indicate order of ingredients.
[2] Prepared by elevated temperature chlorination of alloy Fe-Mo and Fe-W, see Table A.

In summation the catalysts of this invention can polymerize (1) olefins to produce high strength, rigid polymers, (2) dienes to produce elastomers of controlled structure, and (3) polymers with properties suitable for high speed molding and use as structural materials.

The wide range of catalyst type based on a plurality of metal compounds and modifiers enables us to prepare polymeric materials from a wide range of monomers even in combination to produce new and unique polymers and copolymers.

Further, the raw materials required to produce the catalyst system of this invention are economically very feasible and available. The catalyst composition ingredients are not particularly hazardous to handle.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and all modifications that come within the meaning and range of equivalency of the claims are intended to be included therein.

We claim:

1. A solid catalyst for the production of high polymers of polymerizable unsaturated hydrocarbons which comprises (a) alkali metal metallated aryl hydrocarbon polymer in which the alkali metal is attached to the polymer by a metal to carbon bond, (b) Friedel-Crafts compound comprising halogen and a metal and (c) particulate alkali metal halide.

2. A solid catalyst for the production of high polymers of polymerizable unsaturated hydrocarbons which comprises (a) a sodium alkyl, (b) a sodium metallated polymer of a vinyl benzene and (c) a particulate inorganic material which is anhydrous, chemically inert to said crystalline compound and said organo-metallic compound, and insoluble in hydrocarbons.

3. A solid catalyst for the production of high polymers of polymerizable unsaturated hydrocarbons which comprises amyl sodium, sodium metallated α-methyl styrene polymer and sodium chloride.

References Cited by the Examiner

UNITED STATES PATENTS

| 1,938,870 | 12/33 | Shriver. | |
| 2,380,475 | 7/45 | Stewart | 260—94.3 X |
| 2,455,058 | 11/48 | Herman | 260—665 |
| 2,464,685 | 3/49 | Hirsch | 260—665 |
| 2,481,273 | 9/49 | Young | 260—85.3 |
| 2,491,116 | 12/49 | Kraus | 252—429 |
| 2,520,439 | 8/50 | Sailors | 252—429 |
| 2,692,257 | 10/54 | Zletz. | |
| 2,721,189 | 10/55 | Anderson et al. | 260—94.9 |
| 2,739,141 | 3/56 | Ernst et al. | 260—85.3 |
| 2,881,156 | 4/59 | Pilar et al. | 252—429 |
| 3,007,881 | 11/61 | Robinson et al. | 252—429 |
| 3,007,907 | 11/61 | Robinson et al. | 252—429 |
| 3,047,513 | 7/62 | Gresham | 252—429 |
| 3,058,963 | 10/62 | Vandenberg | 252—429 |

FOREIGN PATENTS 538,782  12/55  Belgium.

OTHER REFERENCES

Mellor: "Comprehensive Treatise on Inorganic and Theoretical Chemistry," Longmans, Green and Co., New York, publ. 1935, vol. 14, pp. 40–1.

Meyer et al.: "Zeitschrift fur Anorganische Chemie," 1924, vol. 135, p. 183.

Vosmaer: "Fresenius, Zeitschrift fur Analytische Chemie," vol. 28, 1889, p. 324.

TOBIAS E. LEVOW, *Primary Examiner*.

ALPHONSO D. SULLIVAN, ALLAN M. BOETTCHER, PHILIP E. MANGAN, JULIUS GREENWALD, JOSEPH R. LIBERMAN, *Examiners*.